United States Patent
Hsieh et al.

(10) Patent No.: US 7,102,719 B2
(45) Date of Patent: Sep. 5, 2006

(54) IN-PLANE SWITCHING MODE THIN FILM TRANSISTOR LIQUID CRYSTAL DISPLAY DEVICE WITH ALTERNATING PIXEL AND COMMON ELECTRODE BONES

(75) Inventors: Tsau-Hua Hsieh, Miao-Li (TW); Jia-Pang Pang, Miao-Li (TW); Cheuh-Ju Chen, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 104 days.

(21) Appl. No.: 10/871,141

(22) Filed: Jun. 18, 2004

(65) Prior Publication Data
US 2004/0257514 A1 Dec. 23, 2004

(30) Foreign Application Priority Data
Jun. 18, 2003 (TW) ................ 92116597 A (51) Int. Cl.
*G02F 1/1343* (2006.01)
(52) U.S. Cl. .................. 349/141; 349/143
(58) Field of Classification Search ............... 349/141, 349/143
See application file for complete search history.

(56) References Cited

U.S. PATENT DOCUMENTS

| | | | |
|---|---|---|---|
| 5,600,464 A | | 2/1997 | Ohe et al. |
| 5,914,761 A | * | 6/1999 | Ohe et al. ............ 349/132 |
| 5,995,187 A | * | 11/1999 | Wakagi et al. .......... 349/141 |
| 6,014,190 A | * | 1/2000 | Kim et al. ............ 349/141 |
| 6,088,078 A | * | 7/2000 | Kim et al. ............ 349/141 |
| 6,285,429 B1 | * | 9/2001 | Nishida et al. .......... 349/141 |
| 6,317,182 B1 | | 11/2001 | Shimizu et al. |
| 6,829,028 B1 | * | 12/2004 | Lai et al. ............ 349/141 |
| 6,856,371 B1 | * | 2/2005 | Kim et al. ............ 349/141 |
| 6,954,246 B1 | * | 10/2005 | Kim et al. ............ 349/129 |
| 2003/0197825 A1 | * | 10/2003 | Lee et al. ............ 349/141 |
| 2004/0212769 A1 | * | 10/2004 | Lee et al. ............ 349/141 |
| 2004/0218130 A1 | * | 11/2004 | Hsieh et al. ............ 349/139 |

* cited by examiner

*Primary Examiner*—Tarifur R. Chowdhury
(74) *Attorney, Agent, or Firm*—Wei Te Chung (57) ABSTRACT

An LCD device (2) includes two substrates (21, 22), a liquid crystal layer (27) therebetween, and gate lines (24) and data lines (23) formed on one substrate thereby defining pixel regions. A set of pixel electrodes (26) and a set of common electrodes (25) are provided in each pixel region. A first subset of the pixel electrodes and a first subset of the common electrodes are disposed parallel to each other in alternating fashion and extend along a first horizontal axis, a second subset of the pixel electrodes and a second subset of the common electrodes are disposed parallel to each other in alternating fashion and extend along a second horizontal axis, and the first and second axes are inclined at respective angles relative to the data lines. Thus when voltage is applied, liquid crystal molecules are twisted in two different directions (281, 282) so as to reduce color shift.

5 Claims, 7 Drawing Sheets

IN-PLANE SWITCHING MODE THIN FILM TRANSISTOR LIQUID CRYSTAL DISPLAY DEVICE WITH ALTERNATING PIXEL AND COMMON ELECTRODE BONES

BACKGROUND OF THE INVENTION

1. Field of the Invention

The present invention relates to a liquid crystal display (LCD) device, and more particularly to a two-domain in-plane switching (IPS) mode thin film transistor (TFT) LCD device.

2. Description of Prior Art

In a conventional liquid crystal display, a pair of facing transparent electrodes is respectively formed on two substrates, and is used for driving a liquid crystal layer therebetween. In such a device, a displaying means known as a TN (twisted nematic) display is adopted. That is, the liquid crystal display operates by being supplied with an electric field having a direction orthogonal to inner surfaces of the substrates.

However, the TN mode LCD has a narrow viewing angle, which means that the quality of the display greatly depends on the direction of viewing. In order to obtain a wide viewing angle, the IPS type LCD has been developed.

A detailed explanation about operation modes of a typical IPS-LCD device is provided hereinbelow, with reference to FIGS. 5 through 7.

Figure 5:
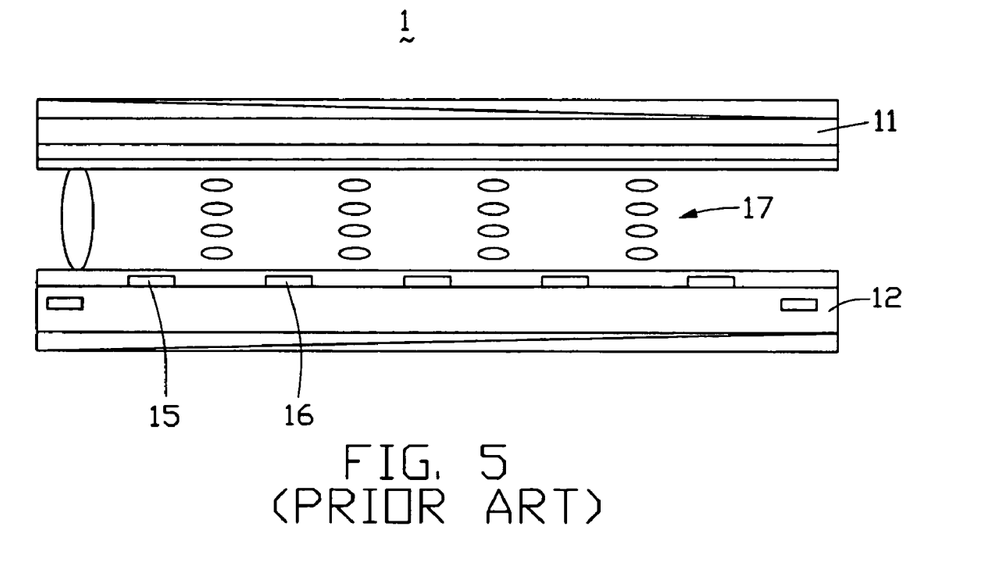
FIG. 5 is a schematic, side cross-sectional view of part of a conventional LCD device, showing the LCD device in a passive state.
Figure 6:
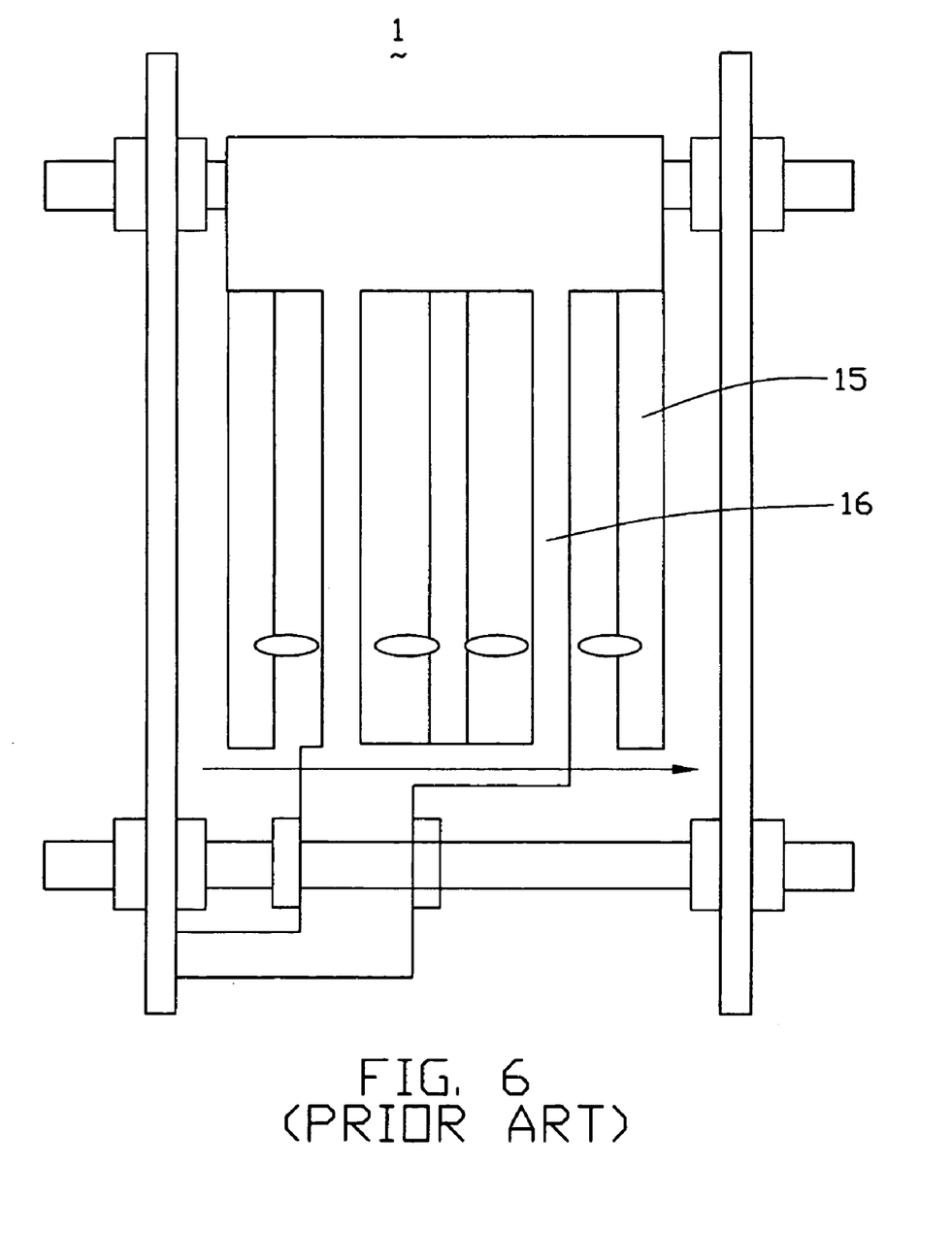
FIG. 6 is a top plan view of a configuration of electrodes of the LCD device of FIG. 5.

As shown in FIGS. 5–6, the IPS-LCD device 1 comprises upper and lower substrates 11 and 12 spaced apart from each other, and a liquid crystal layer 17 provided therebetween. The substrates 11 and 12 are called a color filter substrate and a TFT substrate, respectively. A multiplicity of pixel electrodes 16 and common electrodes 15 are disposed on the lower substrate 12. The pixel electrodes 16 and the common electrodes 15 are parallel to but spaced apart from each other.

When no electric field is applied between the pixel and common electrodes 16 and 15, long axes of liquid crystal molecules in the liquid crystal layer 17 maintain a predetermined angle relative to the pixel and common electrodes 16 and 15. Typically, the angle is 45 degrees, as represented in FIG. 5.

Figure 7:
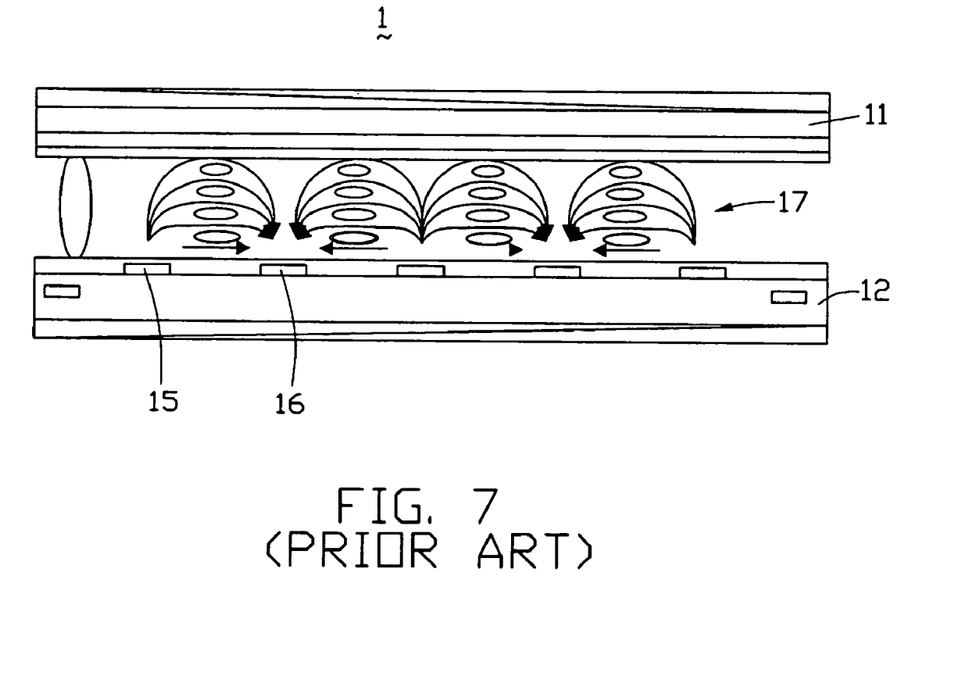
FIG. 7 is similar to FIG. 5, but showing the LCD device when voltage is applied thereto.

As shown in FIG. 7, when a voltage is applied between the pixel and common electrodes 16 and 15, a horizontal in-plane electric field that is parallel to a surface of the lower substrate 12 is established between the pixel and common electrodes 16 and 15. The liquid crystal molecules are twisted so as to align according to the electric field. That is, the long axes of the liquid crystal molecules are oriented perpendicular to the pixel and common electrodes 16 and 15.

The IPS-LCD device 1 is a conventional single-domain IPS-LCD device. This type of IPS-LCD device has the following inherent problem. Because the pixel and common electrodes 16 and 15 are all oriented in a single direction, the liquid crystal molecules are rotated in a single direction only. This means that an associated display screen exhibits color shift when the display screen is obliquely viewed while displaying white.

It is desired to provide an improved liquid crystal display device which overcomes the above problem.

SUMMARY OF THE INVENTION

It is an object of the present invention to provide a liquid crystal display device having two domains so as to reduce color shift.

In order to achieve the object set forth, a liquid crystal display device in accordance with the present invention includes a pair of substrates, a liquid crystal layer contained between the substrates, and a plurality of gate lines and data lines formed on one of the substrates thereby defining a plurality of pixel regions. A set of pixel electrodes and a set of common electrodes are provided in each of the pixel regions. A first subset of the pixel electrodes and a first subset of the common electrodes are disposed parallel to each other in alternating fashion and extend along a first horizontal axis, a second subset of the pixel electrodes and a second subset of the common electrodes are disposed parallel to each other in alternating fashion and extend along a second horizontal axis different from the first horizontal axis, and the first and second horizontal axes are inclined at respective angles relative to the data lines. Thus when voltage is applied to the liquid crystal display device, liquid crystal molecules in the liquid crystal layer are twisted in two different directions so as to reduce color shift.

Other objects, advantages, and novel features of the present invention will become more apparent from the following detailed description when taken in conjunction with the accompanying drawings.

DETAILED DESCRIPTION OF THE PRESENT INVENTION

Figure 1:
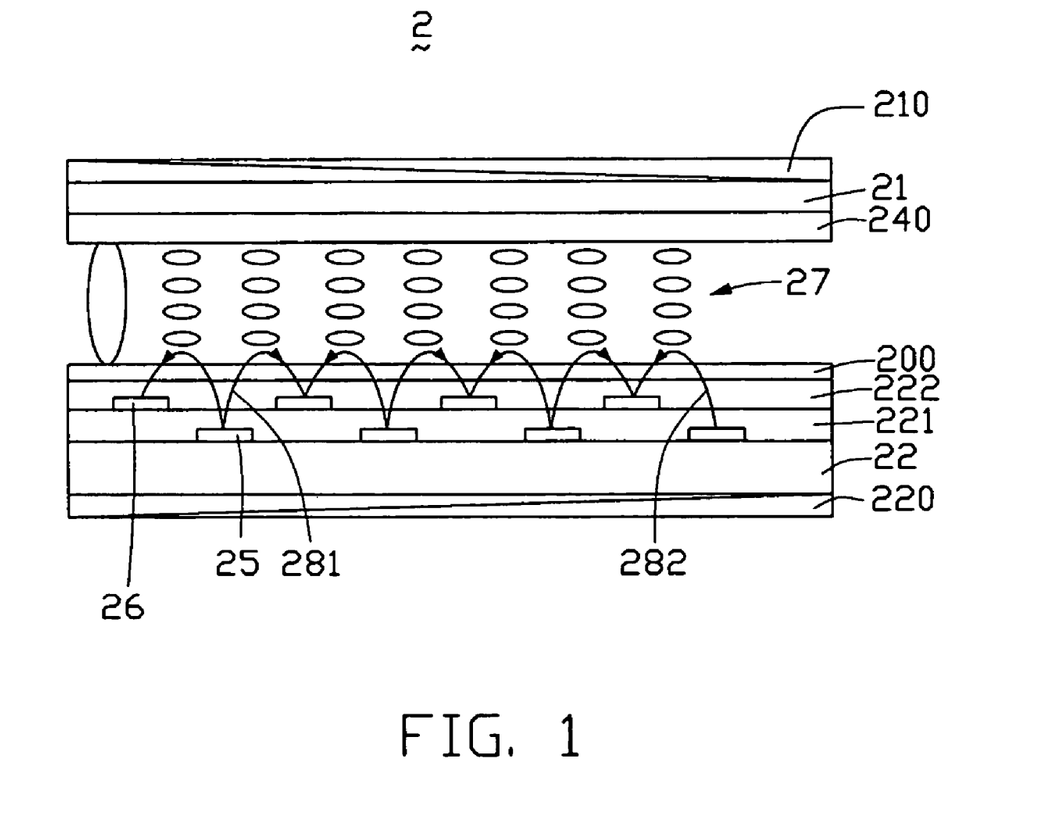
FIG. 1 is a schematic, side cross-sectional view of part of an LCD device according to a first embodiment of the present invention, shown when voltage is applied thereto.

Referring to FIG. 1, an LCD device 2 of the first embodiment of the present invention includes a transparent first substrate 21, a transparent second substrate 22, and a liquid crystal layer 27 sandwiched between the first and second substrates 21 and 22.

A color filter 240 is provided on a surface of the first substrate 21 opposite to the second substrate 22. An alignment film 200 is coated on a surface of the second substrate 22 opposite to the first substrate 21, such that the liquid crystal 27 is sandwiched between the alignment film 200 and the color filter 240. In a passive state, liquid crystal molecules in the liquid crystal layer 27 are substantially uniformly aligned in a direction according to the alignment film 200.

A polarizing plate 210 is adhered to an outer surface of the first substrate 21, and a polarizing plate 220 is adhered to an outer surface of the second substrate 22. The polarizing plates 210 and 220 respectively have polarizing axes perpendicular to each other, with one of the polarizing axes being set parallel to the direction in which the liquid crystal molecules are aligned in the passive state.

Common electrodes 25 are directly formed on a surface of the second substrate 22, and an insulating layer 221 is formed on said surface of the second substrate 22 such that it also covers the common electrodes 25. Pixel electrodes 26 are directly formed on a surface of the insulating layer 221, and a passivation film 222 is formed on said surface of the insulating layer 221 such that it also covers the pixel electrodes 26.

Figure 2:
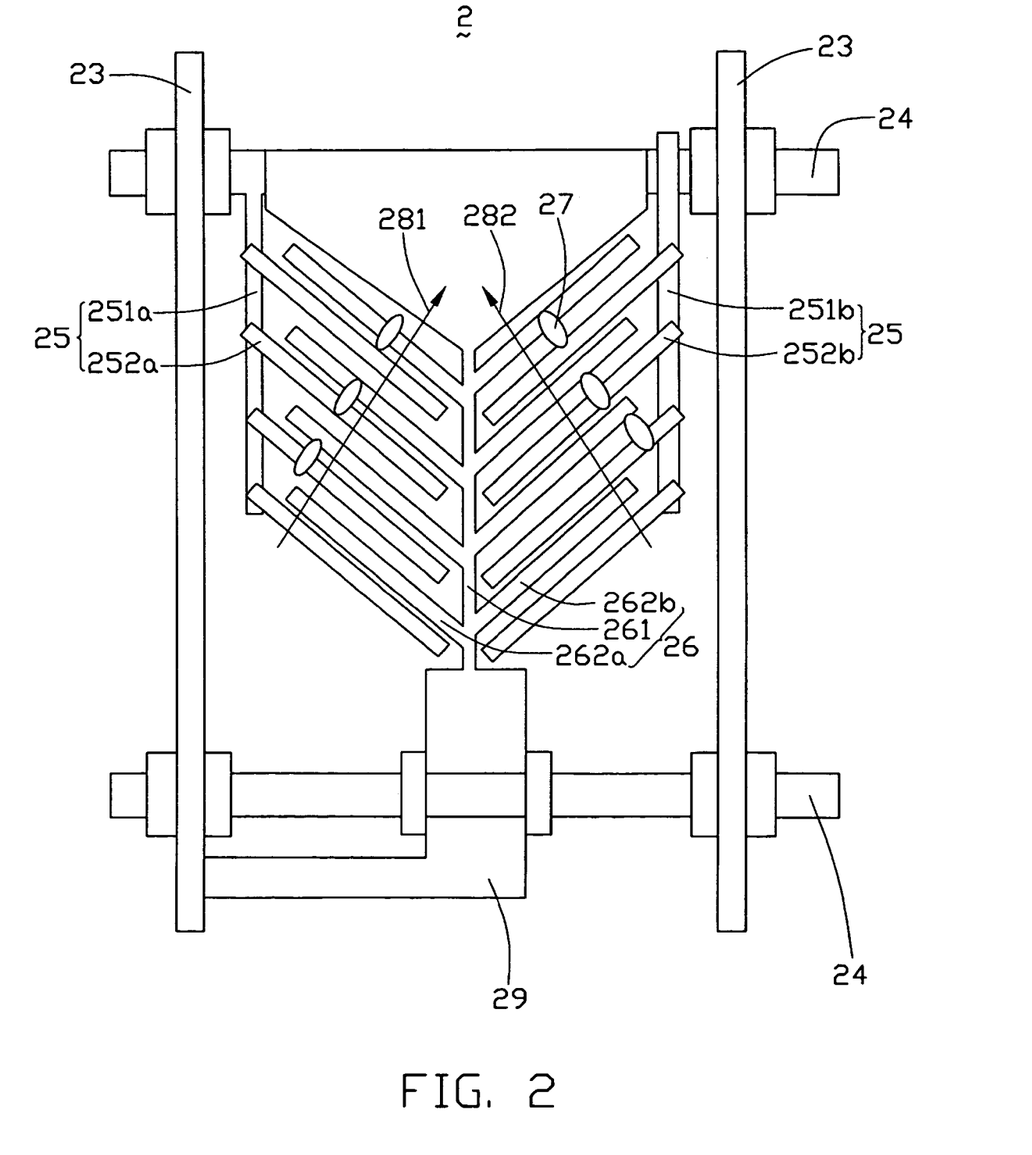
FIG. 2 is a top plan view of a configuration of electrodes of the LCD device of FIG. 1.

Also referring to FIG. 2, two parallel gate lines 24 orthogonally cross two parallel data lines 23, thereby defining a rectangular pixel region. A TFT device 29, two comb-shaped pixel electrodes 26 and two comb-shaped common electrodes 25 are provided in the pixel region.

The pixel and common electrodes 26, 25 are made of a transparent conductive material such as indium-tin-oxide (ITO) or indium-zinc-oxide (IZO). The common electrodes 25 include wirings 251a, 251b, which are disposed substantially parallel to the data lines 23. A plurality of bones 252a obliquely extends from the wiring 251a in first direction, and a plurality of bones 252b obliquely extends from the wiring 251b in a second direction that is different from the first direction. The bones 252a are parallel to each other, and the bones 252b are parallel to each other.

The pixel electrodes 26 share a common central wiring 261 connecting to a drain electrode (not labeled) of the TFT device 29, the wiring 261 being disposed essentially parallel to the data lines 23. A plurality of bones 262a and 262b obliquely extends in alternate fashion from opposite long sides of the wiring 261, in two directions that are respectively parallel to the bones 252a and 252b. Thus the bones 252a, 262a are arranged in alternate fashion at one of said long sides of the wiring 261, and the bones 252b, 262b are arranged in alternate fashion at the other of said long sides of the wiring 261.

In operation, a common voltage is applied to the common electrodes 25, and another voltage is applied to the pixel electrodes 26. A horizontal electric field in two directions 281 and 282 is thereby established, the directions 281 and 282 spanning respectively between the bones 252a and 262a, and between the bones 252b and 262b. The electric field causes liquid crystal molecules in the liquid crystal layer 27 to be twisted in a plane that is parallel to the substrates 21 and 22, for controlling a corresponding display.

According to the configuration of the common and pixel electrodes 25, 26, an electric field is generated in the directions 281 and 282 that are different from each other, so as to form two regions in the spaces defined between the bones 252a and 262a, and between the bones 252b and 262b. Accordingly, the liquid crystal molecules in the liquid crystal layer 27 are twisted in the two different directions 281 and 282.

As a result, when the display screen is obliquely viewed while displaying white, two different colors can be seen in two regions of the display screen corresponding to said two regions in said space. The two colors compensate for each other, thereby reducing the color shift.

Figure 3:
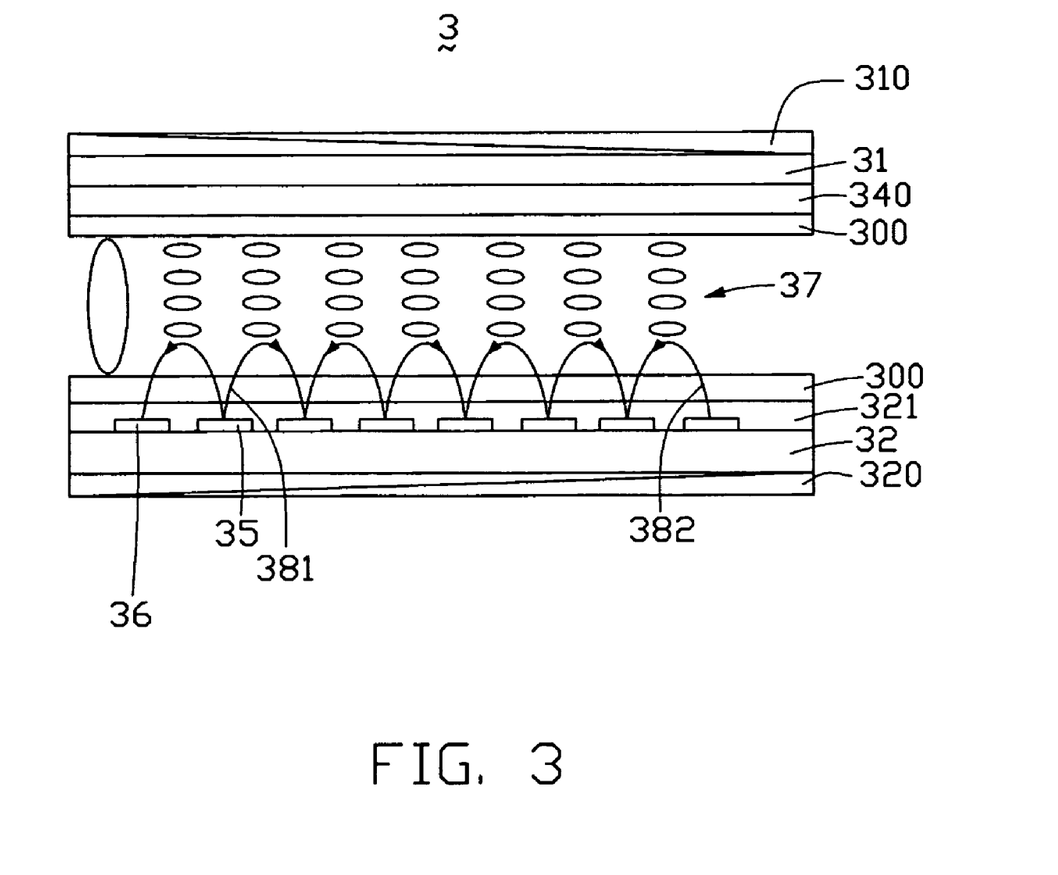
FIG. 3 is a schematic, side cross-sectional view of part of an LCD device according to a second embodiment of the present invention, shown when voltage is applied thereto.

Referring to FIG. 3, an LCD device 3 according to the second embodiment of the present invention is shown. The LCD device 3 has a configuration similar to the LCD device 2 of the first embodiment. Upper and lower substrates 31 and 32 are spaced apart from each other, and a liquid crystal layer 37 is sandwiched therebetween.

A color filter 340 is provided on an undersurface of the upper substrate 31. An alignment film 300 is coated on an undersurface of the color filter 340, and another alignment film 300 is coated on a surface of the lower substrate 32 nearest to the liquid crystal layer 37, such that the liquid crystal layer 37 is sandwiched between the alignment films 300. In a passive state, liquid crystal molecules in the liquid crystal layer 37 are substantially uniformly aligned in a direction according to the alignment films 300.

The upper and lower substrates 31 and 32 have polarizing plates 310 and 320 adhered to outer surfaces thereof, respectively. The polarizing plates 310 and 320 respectively have polarizing axes perpendicular to each other, with one of the polarizing axes being set parallel to the direction in which the liquid crystal molecules are aligned in the passive state.

Common and pixel electrodes 35 and 36 are directly formed on a surface of the lower substrate 32, and an insulating layer 321 is formed on said surface of the lower substrate 32 such that it also covers the common and pixel electrodes 35 and 36.

Figure 4:
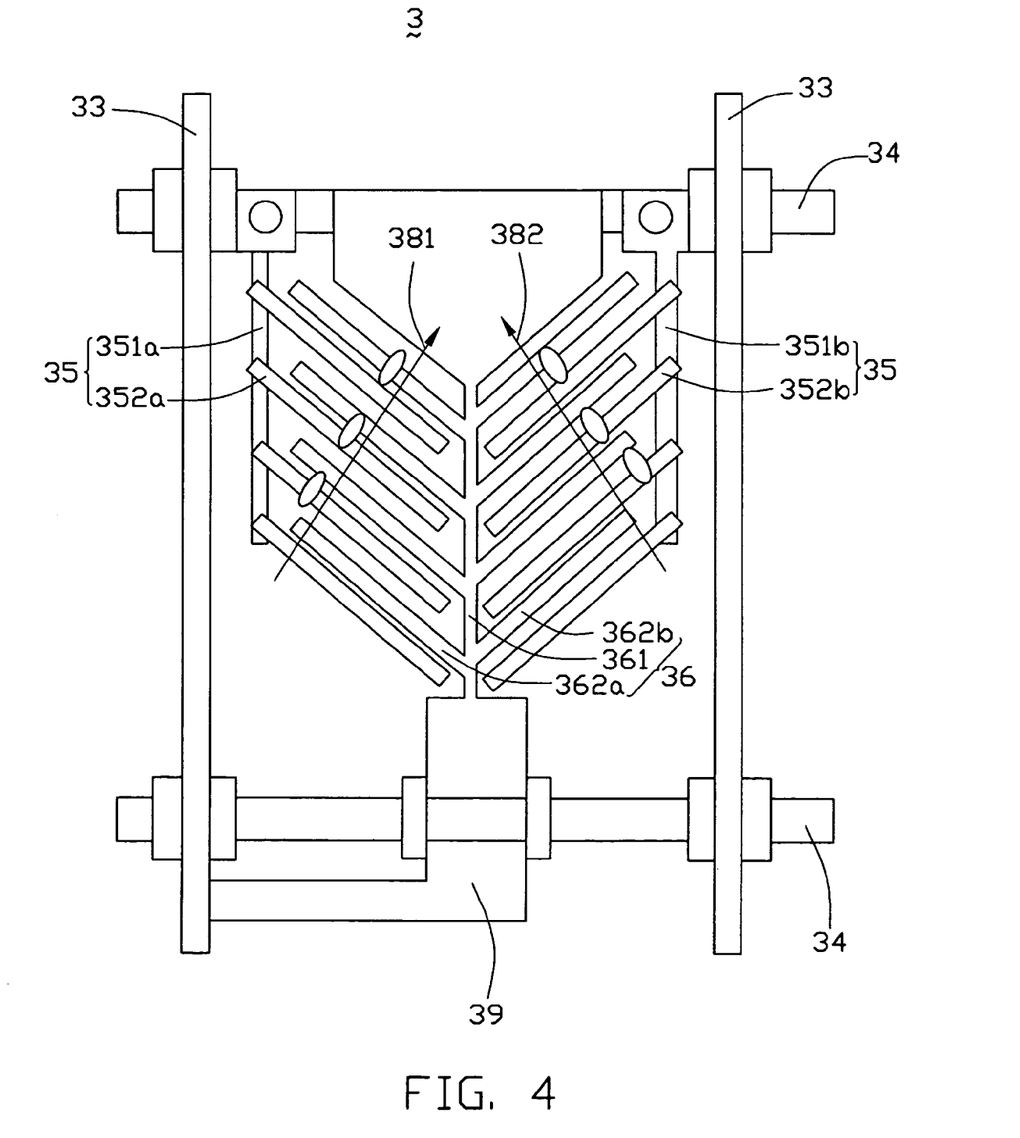
FIG. 4 is a top plan view of a configuration of electrodes of the LCD device of FIG. 3.

Also referring to FIG. 4, two parallel gate lines 34 orthogonally cross two parallel data lines 33, thereby defining a rectangular pixel region. A TFT device 39, two comb-shaped pixel electrodes 36 and two comb-shaped common electrodes 35 are provided in the pixel region.

The pixel and common electrodes 36, 35 are made of a transparent conductive material such as indium-tin-oxide (ITO) or indium-zinc-oxide (IZO). The common electrodes 35 and pixel electrodes 36 are formed directly on the lower substrate 32. The common electrodes 35 include wirings 351a, 351b, and bones 352a, 352b obliquely extending in two different directions from the wirings 351a, 351b respectively. The bones 352a are parallel to each other, and the bones 352b are parallel to each other.

The pixel electrodes 36 share a common central wiring 361 connecting to a drain electrode (not labeled) of the TFT device 39, the wiring 361 being disposed essentially parallel to the data lines 33. A plurality of bones 362a and 362b obliquely extends in alternate fashion from opposite long sides of the wiring 361, in two directions that are respectively parallel to the bones 352a and 352b. Thus the bones 352a, 362a are arranged in alternate fashion at one of said long sides of the wiring 361, and the bones 352b and 362b are arranged in alternate fashion at the other of said long sides of the wiring 361. All the bones 352a, 352b, 362a, 362b are disposed at a same level on the lower substrate 32.

In operation, a common voltage is applied to the common electrodes 35, and a voltage is applied to the pixel electrodes 36. A horizontal electric field in two directions 381 and 382 is thereby established respectively between the bones 352a and 362a, and between the bones 352b and 362b. The electric field causes liquid crystal molecules in the liquid crystal layer 37 to be twisted in a plane that is parallel to the substrates 31 and 32, for controlling a corresponding display.

According to the configuration of the common and pixel electrodes 35, 36, an electric field is generated in the directions 381 and 382 that are different from each other, so as to form two regions in the spaces defined between the bones 352a and 362a, and between the bones 352b and 362b. Accordingly, the liquid crystal molecules in the liquid crystal layer 37 are twisted in the two different directions 381 and 382.

Compared with the conventional single-domain IPS-LCD device 1 of the prior art, the liquid crystal molecules in the LCD devices 2, 3 are twisted in the two different directions 281, 282, and 381, 382 respectively. As a result, when the corresponding display screen is obliquely viewed while displaying white, two different colors can be seen in two regions of the display screen corresponding to said two regions in said space. Because the two colors compensate for each other, the color shift is reduced. Furthermore, the pixel and common electrodes 26, 36, 25, 35 are made of a transparent conductive material, so that the aperture ratio of the LCD devices 2, 3 is improved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
   a pair of substrates;
   a liquid crystal layer sandwiched between the substrates; and
   a plurality of gate lines and data lines formed on one of the substrates, thereby defining a plurality of pixel regions; wherein
   each of the pixel regions comprises:
      a set of pixel electrodes having a wiring and a plurality of bones extending obliquely from the wiring; and
      a set of common electrodes having two wirings and a plurality of bones extending obliquely from the wirings respectively; and
   in each of the pixel regions a plurality of bones of the pixel and the common electrodes are disposed parallel to each other in alternating fashion and extend along a first horizontal axis, a plurality of bones of the pixel and the common electrodes are disposed parallel to each other in alternating fashion and extend along a second horizontal axis different from the first horizontal axis, and the first and second horizontal axes are inclined at respective angles relative to the data lines.

2. The liquid crystal display device as claimed in claim 1, further comprising an insulating layer covering the set of common electrodes.

3. The liquid crystal display device as claimed in claim 2, wherein the set of pixel electrodes is located on the insulating layer.

4. The liquid crystal display device is claimed in claim 3, further comprising a passivation layer covering the set of pixel electrodes.

5. The liquid crystal display device as claimed in claim 1, wherein the pixel electrodes and the common electrodes are located at a same level relative to said one of the substrates.

* * * * *